United States Patent [19]

Reddig et al.

[11] Patent Number: 5,359,041
[45] Date of Patent: Oct. 25, 1994

[54] PYRIDONE DYESTUFFS

[75] Inventors: Wolfram Reddig, Bergisch Gladbach; Karl-Joef Herd, Odenthal-Holz, both of Fed. Rep. of Germany

[73] Assignee: Bayer Aktiengesellschaft, Leverkusen, Fed. Rep. of Germany

[21] Appl. No.: 907,277

[22] Filed: Jul. 1, 1992

[30] Foreign Application Priority Data

Jul. 11, 1991 [DE] Fed. Rep. of Germany ....... 4122866

[51] Int. Cl.$^5$ .................... C09B 62/245; D06P 1/382
[52] U.S. Cl. ........................... 534/635; 534/606
[58] Field of Search .................. 534/606, 635

[56] References Cited

U.S. PATENT DOCUMENTS

| | | | |
|---|---|---|---|
| 3,669,951 | 6/1972 | Bien et al. | 534/638 |
| 4,039,523 | 8/1977 | Hegar | 534/635 |
| 4,065,446 | 12/1977 | Bien et al. | 534/632 X |
| 4,067,864 | 1/1978 | Oesterlein et al. | 534/635 |
| 4,283,331 | 8/1981 | Seitz et al. | 534/635 X |
| 4,299,764 | 11/1981 | Jager, I | 534/635 |
| 4,560,388 | 12/1985 | Rohrer | 534/632 X |
| 4,978,746 | 12/1990 | Herd | 534/635 X |

FOREIGN PATENT DOCUMENTS

| | | |
|---|---|---|
| 2238795 | 2/1973 | Fed. Rep. of Germany . |
| 2903021 | 7/1980 | Fed. Rep. of Germany ...... 534/635 |
| 2906191 | 8/1980 | Fed. Rep. of Germany ...... 534/635 |
| 3542001 | 6/1987 | Fed. Rep. of Germany . |
| 4034993 | 5/1991 | Fed. Rep. of Germany . |
| 2238056 | 5/1991 | United Kingdom . |

OTHER PUBLICATIONS

Chemical Abstract, vol. 78, (1973), p. 54, Abs. No. 148962w.

Publication Laing, Rev. Prog. Coloration, vol. 21, 1991, pp. 56–71.

Master Haelters "Reliable Reactive Dyeing, A Never Ending Search for Perfection", Melliand Textiberichte, Dec. 1980, pp. 1016–1026.

Water Quality-Determination of Adsorbable Organic Halogens (AOX); ISO 9562: 1989 (E); (pp. i–iii & 1–8).

Dr. Ulrich Sewekow, Leverkusen, Treatment of reactive dye effluents with hydrogen peroxid/iron(II) sulphate; E 68, Mellian, English, Feb. 1993.

Primary Examiner—Patricia L. Morris
Assistant Examiner—Fiona T. Powers
Attorney, Agent, or Firm—Sprung Horn Kramer & Woods

[57] ABSTRACT

Dyestuffs of the formula

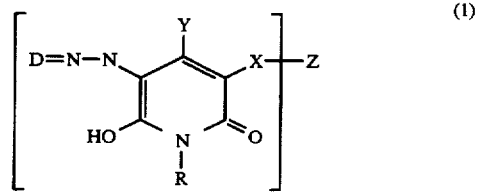

in which the substituents have the meaning given in the description, are suitable for the dyeing and printing of, for example, cellulose and polyamides.

5 Claims, No Drawings

PYRIDONE DYESTUFFS

The invention relates to reactive dyestuffs containing a difluoropyrimidine radical.

It is true that reactive radicals of this type are already disclosed in German Auslegeschrift 1,644,204 (U.S. Pat. No. 3,669,951) and German Auslegeschrift 2,114,158 (U.S. Pat. No. 4,065,446), but some of them still present problems in practical application.

Furthermore, German Auslegeschrift 3,542,001 and German Auslegeschrift 2,123,061 (U.S. Pat. No. 4,067,864) have already disclosed pyridoneazo reactive dyestuffs. These dyestuffs too are still in need of improvement.

The present invention relates to monoreactive mono- and disazo reactive dyestuffs which, in the form of the free acids, have the formula:

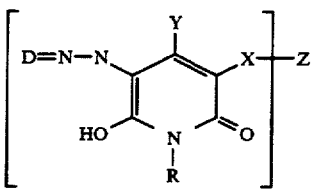
(1)

in which
D denotes the radical of a diazo component,
R denotes H, a $C_1$-$C_6$-alkyl radical which is unsubstituted or substituted by OH, $SO_3H$, $OSO_3H$, $NH_2$, $CO_2H$, $NH(C_1$-$C_4$-alkyl) or $C_1$-$C_4$-alkoxy, a cycloaliphatic $C_3$-$C_6$-hydrocarbon radical, a phenyl or hetaryl radical each of which is unsubstituted or substituted by $SO_3H$, $CO_2H$, $CH_3$, Cl, Br, $OCH_3$, $OC_2H_5$, $NH_2$, $NH(C_1$-$C_4$-alkyl),
X denotes H, Cl, Br, $CH_3$, $CH_2SO_3H$, $CH(CH_3)$-$SO_3H$, $CONH_2$, CN, $SO_2CH_3$, $COCH_3$, $SO_3H$,

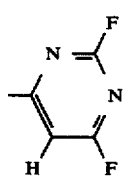
or 1 or

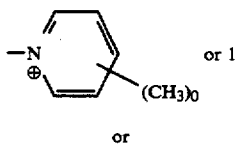

Y denotes H, OH, a $C_1$-$C_4$-alkyl radical which is unsubstituted or substituted by Cl, OH, $SO_3H$, $OSO_3H$, $CO_2H$; a phenyl or benzyl radical each of which is unsubstituted or substituted by $SO_3H$, $CO_2H$, $CH_3$, Cl, Br, $OCH_3$, $OC_2H_5$, $NH_2$, $NH(C_1$-$C_4$-alkyl) or denotes $CO_2H$ and
Z denotes a fibre-reactive radical of the formula (2)

(2)

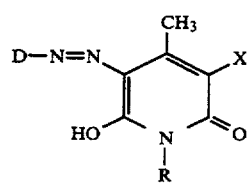

D preferably represents a sulpho-containing radical from the benzene, naphthalene or azobenzene series and can additionally be substituted by further substituents, for example $SO_3H$, $CO_2H$, $C_1$-$C_4$-alkyl, halogen, $C_1$-$C_4$-alkoxy, acylamino, ureido, mesylamino, amino, $C_1$-$C_4$-alkylamino, amino-$C_1$-$C_4$-alkyl, $C_1$-$C_4$-alkylamino-$C_1$-$C_4$-alkyl, especially aminomethyl or (methyl amino) methyl, or 2-aminoethyl sulphonyl or 2-(N-alkylamino) ethylsulphonyl.

Z can be bound to either D or to Y or R.

In a preferred embodiment, the compounds of the formula (1) have the following formula (3):

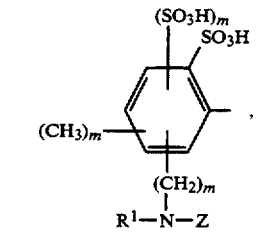
(3)

in which D denotes

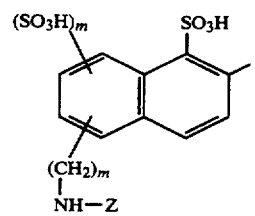,

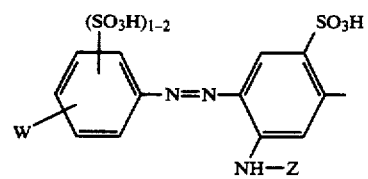

m denotes 0 or 1

R, $R^1$ identical or different denote H, $CH_3$, $C_2H_5$, $C_3H_7$, $C_4H_9$, $CH_2CH_2OH$, $CH_2CH_2SO_3H$, $CH_2CH_2OSO_3H$ or $CH_2CH_2CH_2$-$OCH_3$ X denotes H, $SO_3H$, $CONH_2$ or $CH_2SO_3H$, W denotes H, $CH_3$, $OCH_3$, $OC_2H_5$, Cl, Br, $NHCOCH_3$ or $NHCONH_2$.

In a further preferred embodiment, the compounds of the formula (1) have the following formula (4):

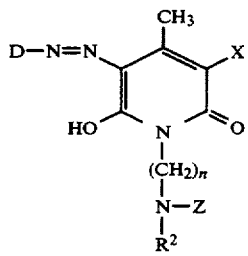

in which
D denotes

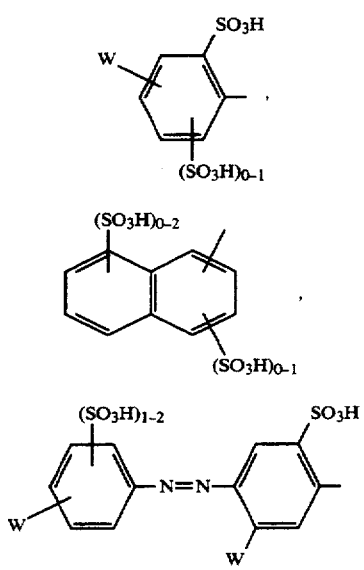

n denotes 2, 3 or 4,
R² denotes H, CH₃, C₂H₅, C₃H₇, C₄H₉, CH₂CH₂OH, CH₂CH₂SO₃H, CH₂CH₂OSO₃H or CH₂CH₂CH₂-OCH₃
X denotes H, SO₃H, CONH₂ or CH₂SO₃H,
W denotes H, CH₃, OCH₃, OC₂H₅, Cl, Br, NHCOCH₃ or NHCONH₂.

Particular preference is given to monoazo reactive dyestuffs of the formula (5)

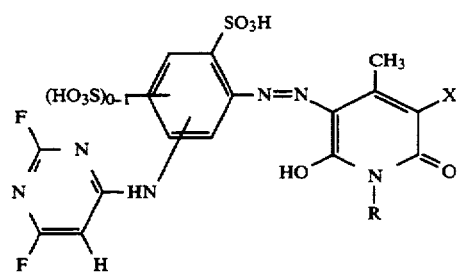

in which X and R have the meaning mentioned for (3) and (4).

The azo dyestuffs according to the invention can exist in a plurality of tautomeric forms. For the sake of simplicity, the dyestuffs are shown in only one of these tautomeric forms.

Dyestuffs (1) are prepared by condensing amino-containing pyridone dyestuffs of the formula

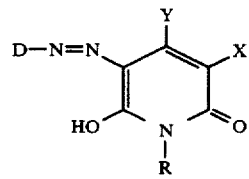

in which D, Y, X and R have the abovementioned meaning and contain an acylatable amino group, with 2,4,6-trifluoro-pyrimidine in the presence of acid-binding agents in a pH range from 3.5-9.5 or else diazotising an amino compound D-NH₂ substituted by Z (=2,6-difluoro-4-pyrimidinyl radical) and coupling the product in a known manner onto a pyridone derivative not containing any radical Z, or diazotising an amino compound D-NH₂ not containing any radical Z and coupling the product in a known manner to a pyridone derivative substituted by Z.

Amino compounds D-NH₂ for the preparation of compound (3), for example those of the formula (7, Q=Z) or (8, Q=Z) are obtained by condensing diamino compounds of the formula (7, Q=H) or (8, Q=H) with 2,4,6-trifluoropyrimidine in the presence of acid-binding agents:

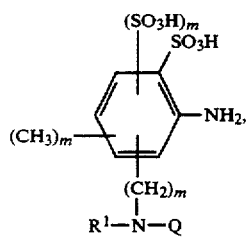

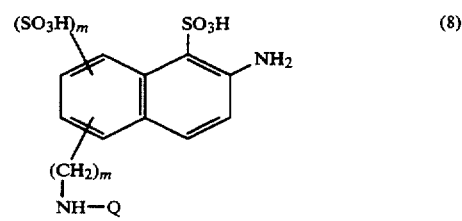

Amino compounds D-NH₂ containing azo groups, such as

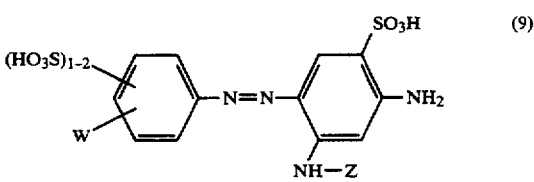

are obtained by diazotisation of aniline derivatives of the formula (10) and coupling of the diazonium compounds

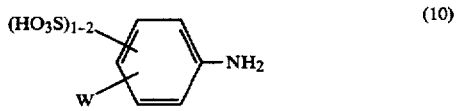

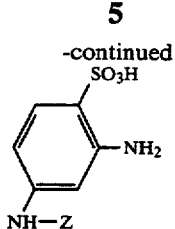

onto a compound of the formula (11).

Amino compounds of the formula D-NH$_2$ for the preparation of compound 4 and also pyridone derivatives free of radicals Z are known from the literature, for example German Offenlegungsschrift 2,123,061 (U.S. Pat. No. 4,067,864). The preparation of Z-substituted pyridone derivatives takes place by condensation of 2,4,6-trifluoropyrimidine with pyridones containing a primary or secondary amine function on one of the substituents.

Preparation of monoazo reactive dyestuffs of the formula (5) takes place either by condensation of aminoazo dyestuffs of the formula

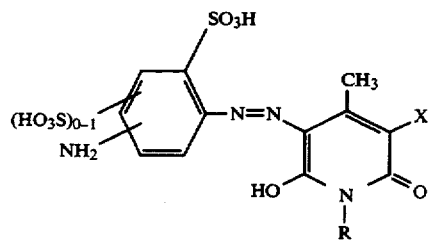

with 2,4,6-trifluoropyrimidine in the presence of acid-binding agents, such as sodium carbonate or bicarbonate, or else by diazotisation of amino compounds of the formula (13)

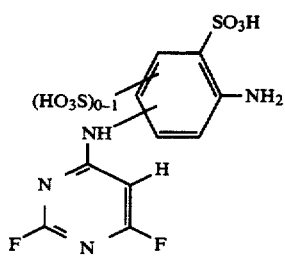

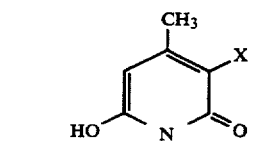

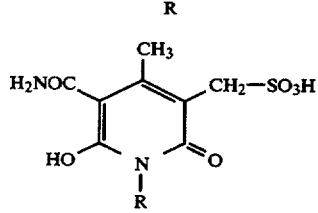

and coupling of the diazoniumcompounds onto pyridones of the formula (14) or (15), as is described, for example, in DE-A-2,162,612 (U.S. Pat. No. 3,994,906).

Compounds (13) are available, for example, by condensation of 2,4-diaminobenzenesulphonic acid or 2,4-diamino-1,5-benzenedisulphonic acid with 2,4,6-trifluoropyrimidine at temperatures of 20° to 50° C. and pH values from 4.5 to 10.0.

The new monofunctional azopyridone dyestuffs containing the fibre-reactive 2,6-difluoro-4-pyrimidinyl radical are suitable for the dyeing and printing of hydroxyl- or amido-containing materials, such as textile fibres, yarns and fabrics made of wool, silk, synthetic polyamide and polyurethane fibres and for the washfast dyeing and printing of native or regenerated cellulose, the treatment of cellulose materials advantageously taking place in the presence of acid-binding agents and, if desired, by heating using processes customary for reactive dyestuffs.

The formulae given of the dyestuffs are those of the corresponding free acids. The dyestuffs are in general isolated in the forth of the alkali metal salts, for example the lithium salts, sodium salts or potassium salts, and used as such for dyeing and printing.

The dyestuffs can be used in dyeing either as a powder or as a concentrated aqueous dyestuff solution.

The dyeings described in the examples below were carried out under the following conditions:

Dyeing procedure 1

2 parts of the dyestuff obtainable according to Example 1 are dissolved in 100 ml of water. The solution is added to 1900 parts of cold water, 60 parts of sodium chloride are added, and this dyebath is entered with 100 parts of a cotton fabric.

The temperature is increased to 60° C., 30 minutes after which 40 parts of calcined sodium carbonate and another 60 parts of sodium chloride are added. The temperature is maintained at 60° C. for 30 minutes, the dyed material is rinsed and soaped in a 0.3% strength boiling solution of a non-ionic detergent for 15 minutes, rinsed and dried, giving a brilliant greenish yellow dyeing having good fastness properties.

Dyeing procedure 2

4 parts of the reactive dyestuff prepared in Example 1 are dissolved in 50 parts of water. 50 parts of a solution containing 5 g of sodium hydroxide and 10 g of calcined sodium carbonate per liter are added. The solution obtained is used to pad a cotton fabric to a liquor pickup of 70%, and the fabric is then wound onto a roll. The cotton fabric is left in this state at room temperature for 3 to 12 hours. The dyed material is then rinsed, soaped at the boil using a non-ionic detergent for a quarter of an hour, rinsed again and dried, giving a brilliant greenish yellow dyeing having good fastness properties.

EXAMPLE 1

27.3 g of 2,4-diaminobenzenesulphonic acid are suspended in 150 ml of water and dissolved at a pH of 6.5, using dilute sodium hydroxide solution. 1 g of sodium dihydrogen phosphate and 1 g of disodium hydrogen phosphate are added as buffer substances, and the mixture is heated to 35° C. 23.2 g of 2,4,6-trifluoropyrimidine are metered in over a period of one hour, and the pH is kept constant between 6.2 and 6.5 during this addition and also in the after reaction phase using sodium carbonate solution. The temperature during acylation rises to 40° C. and drops again to 35° C. after additional stirring for one hour.

200 g of ice and 40 ml of 25% strength hydrochloric acid are added to the acylation mixture, and 35 ml of a sodium nitrite solution (300 g/l) are added dropwise over a period of 15 minutes. By occasional addition of ice, the reaction temperature is maintained below 5° C. Diazotisation is complete after about 30 minutes. The diazo compound has precipitated in light yellow crystalline form. Excess nitrite is removed by sulphamic acid solution.

41.2 g of 1,4-dimethyl-3-aminocarbonyl-5-sulphomethyl-6-hydroxy-2-pyridone sodium salt are dissolved in 250 ml of water at a pH of 7, and this solution is metered into the above diazonium salt suspension. The pH is maintained at 6.5 by dropwise addition of sodium carbonate solution. After 30 minutes, coupling is complete, giving a clear yellow solution. The dyestuff is salted out by addition of 90 g of common salt and isolated at 40° C. by filtering-off with suction. Drying at 50° C. in vacuo gives 135 g of salt-containing yellow dyestuff powder, which dyes cotton by the dyeing process carried out in practice for reactive dyestuffs in a brilliant greenish yellow shade ($\lambda_{max}$=420 nm in H$_2$O).

The dyestuff has the structure

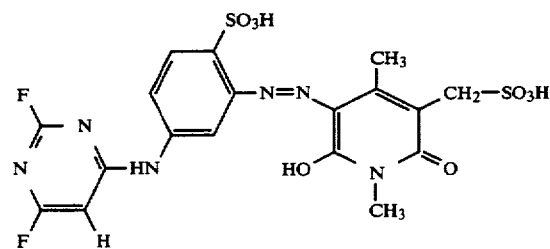

EXAMPLE 2 TO 7

Reactive dyestuffs of similar value and comparable shade are obtained by replacing the 1,1-dimethyl-3-amino-carbonyl-5-sulphomethyl-6-hydroxy-2-pyridone in Example 1 with 1-ethyl-4-methyl-3-aminocarbonyl-5-sulphomethyl-6-hydroxy-2-pyridone (Example 2, $\lambda_{max}$=420 nm), 1-n-butyl-4-methyl-3-aminocarbonyl-5-sulphomethyl-6-hydroxy-2-pyridone (Example 3, $\lambda_{max}$=422 nm), 1,4-dimethyl-3-sulpho-6-hydroxy-2-pyridone (Example 4, $\lambda_{max}$=421 nm), 1-(2-sulphoethyl)-4-methyl-3-aminocarbonyl-6-hydroxy-2-pyridone (Example 5), 1-(2'-sulphatoethyl)-4-methyl-6-hydroxy-2-pyridone (Example 6) or 4-carboxy-6-hydroxy-2-pyridone (=citrazinic acid) (Example 7) as the coupling component.

EXAMPLE 8

38.9 g of 2,5-diamino-1,4-benzenedisulphonic acid are condensed completely analogously to 2,4-diaminobenzenesulphonic acid in Example 1 with 23.2 g of 2,4,6-trifluoropyrimidine at 40° C., the condensation product is diazotised and the diazonium salt is coupled analogously to Example 1 onto 18.1 g of 1,4-dimethyl-6-hydroxy-2-pyridone. A dyestuff of the structure

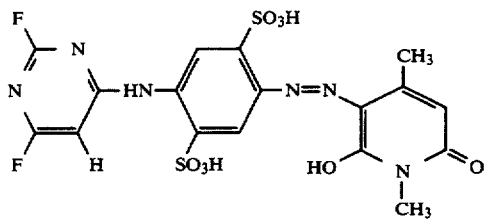

is isolated, which dyes cotton in a yellow hue.

EXAMPLE 9

The three reaction steps analogously to Examples 1 and 8 are repeated, using 2,4-diamino-1,5-benzenedisulphonic acid, 2,4,6-trifluoropyrimidine and 1,4-dimethyl-3-aminocarbonyl-6-hydroxy-2-pyridone in the corresponding relative amounts, giving a dyestuff of the structure

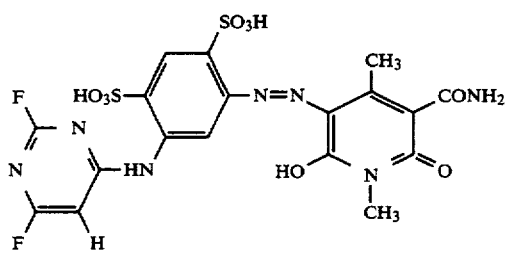

EXAMPLE 10

36.5 g of 5-aminomethyl-2-amino-1-naphthalenesulphonic acid are stirred in 300 ml of water, 100 g of ice and 80 ml of 25% strength hydrochloric acid and diazotised with 35 ml of a 30% strength sodium nitrite solution. The resulting solution of the diazonium salt, after removal of excess nitrite, is metered into a solution of 41.2 g of 1,4-dimethyl-3-aminocarbonyl-5-sulphomethyl-6-hydroxy- 2-pyridone (sodium salt) in 250 ml of water. During this addition the pH is kept constant between 6.5 and 7.5 by dropwise addition of sodium carbonate solution. The coupling reaction is complete after 30 minutes.

The mixture is then heated to 35° C., and 23.2 g of 2,4,6-trifluoropyrimidine are added in portions. At the same time, sodium carbonate solution is metered in in such a manner that the pH is in the range from 7.5 to 8.5. The dyestuff slowly crystallises. After an additional stirring time of one hour, 40 g of sodium chloride are added, the mixture is stirred for 30 minutes, and the dyestuff is isolated. The dry dyestuff powder, which has the structure

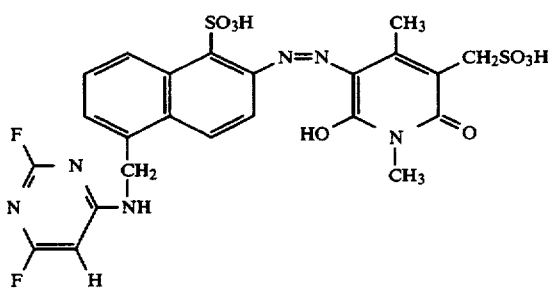

produces on cotton a clear, greenish yellow dyeing ($\lambda_{max}$=432 nm).

dried, it dyes cotton in a greenish yellow hue and has the structure

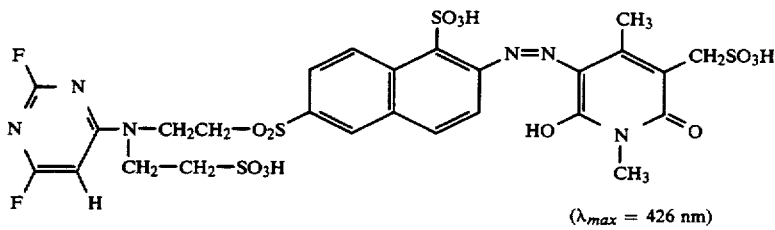

($\lambda_{max}$ = 426 nm)

EXAMPLE 11

The procedure of Example 10 is repeated, using equimolar amounts of 2-amino-4-(N-methylaminomethyl)-benzenesulphonic acid now as the diazo component instead of 5-aminomethyl-2-amino-1-naphthalenesulphonic acid, giving a dyestuff of the structure

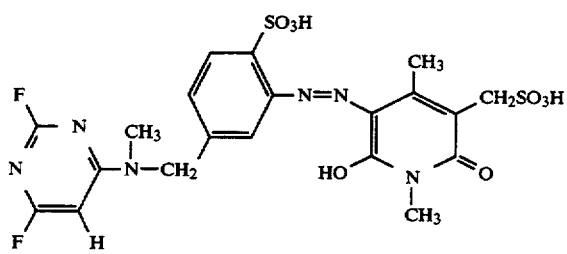

which produces brilliant greenish yellow dyeings on cotton.

EXAMPLE 12

130 g of the salt-containing pyridone dyestuff of the structure

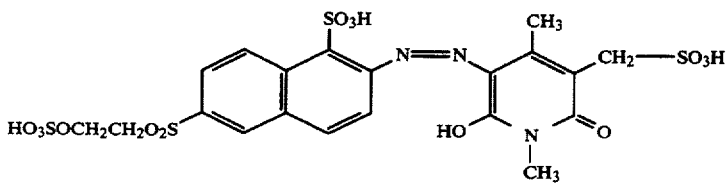

which is described in European Application EP 281,892 (Example 1), are dissolved in 400 ml of water, and a solution of 60 g of sodium2-amainoethanesulphonic acid in 200 ml of water is added. The mixture is heated to 40° C. and stirred at 40° C. for one hour. The pH is then brought to 6.0 with hydrochloric acid, and 140 g of common salt are added. The precipitated dyestuff is filtered off with suction, and the isolated moist dyestuff paste is stirred in 400 ml of water. The pH is corrected to 8.0, and the solution heated to 35° C. 25.0 g of 2,4,6-trifluoropyrimidine are now added in portions, and the pH is kept constant between 7.5 and 8.5 during this addition and the after reaction phase by means of sodium carbonate solution.

The condensation reaction is complete after about 1 hour. The mixture is cooled to 20° C., and the dyestuff is salted out with 50 g of sodium chloride and 50 g of potassium chloride. It is filtered off with suction and

EXAMPLE 13

A diazonium salt mixture prepared by diazotisation of 25.1 g of 3-aminobenzenesulphonic acid is metered into a neutral mixture of 50.0 g of the condensation product from 2,4-diaminobenzenesulphonic acid (sodium salt) and 2,4,6-trifluoropyrimidine (see Example 1) in 250 ml of water. During this addition, the pH is maintained at 6.0 to 6.5 by continuous addition of solid sodium bicarbonate. After a reaction time of six hours, the dyestuff of the structure

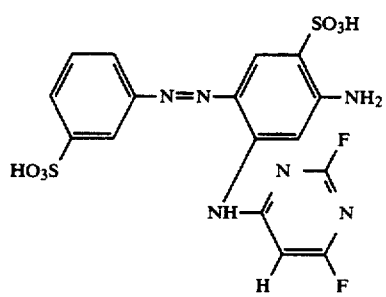

is isolated by salting out with common salt and filtering off with suction. The moist paste of the intermediate is suspended in 200 ml of water and 200 g of ice, and the pH is brought to 2.3 to 2.5 with hydrochloric acid at 0° C. The intermediate is slowly diazotised with 35 ml of a sodium nitrite solution (300 g/l) during which not only the temperature is kept constant at 0° C. but also the pH at 2.3 to 2.5. Stirring is continued for one hour, excess nitrite is removed, and the diazonium salt solution is added to a solution of 41.2 g of 1,4-dimethyl-3-aminocarbonyl-5-sulphomethyl-6-hydroxy-2-pyridone (sodium salt) in 250 ml of water over a period of 30 minutes.

The pH is maintained at 6.5 to 7.5 by dropwise addition of sodium carbonate solution. After addition of the diazonium salt solution, stirring is continued for 15 minutes, and the dyestuff is isolated by salting out (100 g of potassium chloride) and filtration with suction. Drying at 60° C. gives 145 g of a salt-containing red dyestuff powder having the following structure:

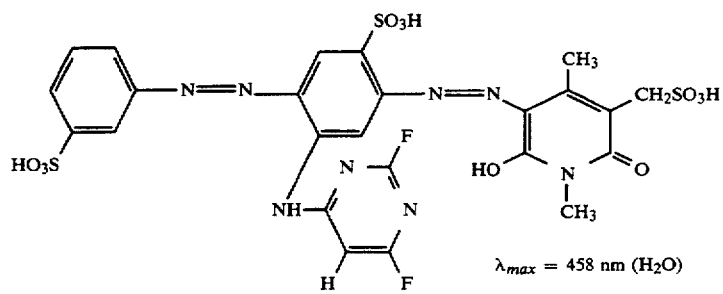

$\lambda_{max} = 458$ nm (H$_2$O)

The new disazopyridone dyestuff dyes cotton in brilliant orange shades.

If the first diazo component and the pyridone derivative are varied in Example 13 and the reactions are carried out as in Example 13, the following, likewise valuable reactive dyestuffs are obtained.

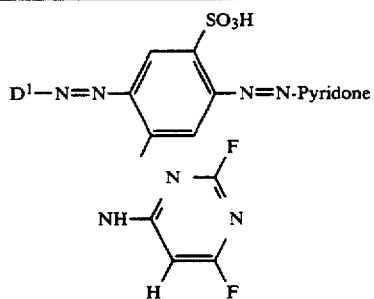

| Example | D$^1$ | Pyridone | Hue |
|---------|-------|----------|-----|
| 14 | HO$_3$S—⟨phenyl⟩— | CH$_3$, CH$_2$SO$_3$H, HO, N-C$_2$H$_5$, =O pyridone | orange (462 nm) |
| 15 | 2,5-disulfo phenyl (SO$_3$H, HO$_3$S) | CH$_3$, CONH$_2$, HO, N-CH$_3$, =O pyridone | bright red |
| 16 | 2,4-disulfo phenyl (SO$_3$H, HO$_3$S) | CH$_3$, HO, N-CH$_3$, =O pyridone | orange |
| 17 | HO$_3$S—⟨phenyl⟩— | CH$_3$, HO, N-CH$_2$-CH$_2$-SO$_3$H, =O pyridone | orange (460 nm) |

-continued

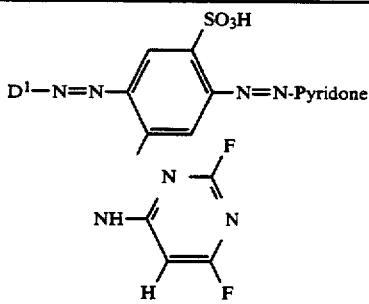

| Example | D¹ | Pyridone | Hue |
|---|---|---|---|
| 18 | 2-CH₃, 5-SO₃H phenyl | 1,4-dimethyl-3-(CH₂SO₃H)-6-hydroxy-2-pyridone | orange (457 nm) |
| 19 | 2-OCH₃... wait | | red |

| Example | D¹ | Pyridone | Hue |
|---|---|---|---|
| 18 | (2-methyl-5-sulfophenyl) | 1,4-dimethyl-3-sulfomethyl-6-hydroxy-2-pyridone | orange (457 nm) |
| 19 | (2-methoxy-5-sulfophenyl... ) | 1,4-dimethyl-3-sulfomethyl-6-hydroxy-2-pyridone | red |
| 20 | (4-sulfophenyl) | 4-carboxy-6-hydroxy-2-pyridone | orange |

EXAMPLE 21

28.6 g of 1-(2-aminoethyl)-3-aminocarbonyl-4-methyl-6-hydroxy-2-pyridone are dissolved in 250 ml of water under neutral conditions, and the solution is heated to 35° C. At a constant pH of 8.0, 23.2 g of 2,4,6-trifluoropyrianidine are added in portions. The pH is controlled by addition of sodium carbonate solution. Stirring at 35° C. is continued for 30 minutes, leading to partial crystallisation of the condensation product of the structure

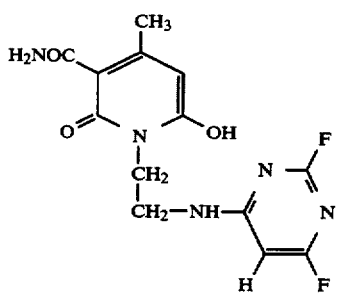

The mixture is heated to 60° C., and 55 ml of a neutral 37% strength hydroxymethanesulphonic acid solution is added at a pH of 7. Heating at 60° C. is continued for another hour at a constant pH of 7, giving a clear reaction solution. The solution of the new intermediate of the structure

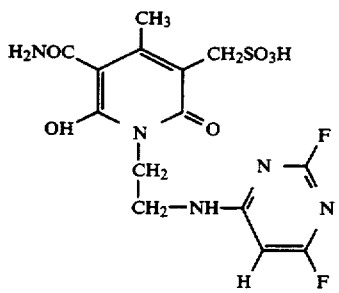

is cooled to room temperature and reacted with a diazonium salt mixture prepared by diazotisation of 47.1 g of 2-amino-1,5-naphthalenedisulphonic acid sodium salt. During the coupling reaction, the pH is kept constant at 6.5 to 7.5 with sodium carbonate solution. After the end of the reaction, the product is salted out with sodium chloride, and the precipitated dyestuff is filtered off with suction. Drying gives about 150 g of a yellow dyestuff powder of the structure

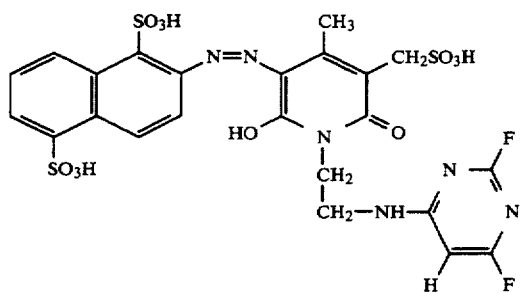

which dyes cotton in clear yellow shades having a high fastness level.

$\lambda_{max}$=430 run (H$_2$O)

By varying the diazo component and the pyridone substitution, further valuable reactive dyestuffs are available analogously to Example 21:

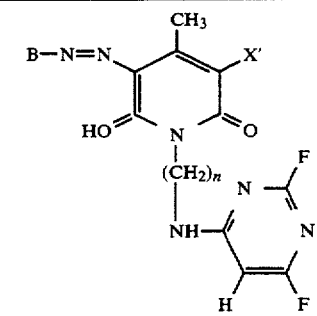

| Example | B | X' | n | Hue |
|---|---|---|---|---|
| 22 | 2-methylphenyl-SO$_3$H | CH$_2$SO$_3$H | 2 | greenish yellow (422 nm) |
| 23 | 2-methylnaphthyl-1-SO$_3$H | CH$_2$SO$_3$H | 2 | yellow |
| 24 | naphthyl-1,3,6-tri-SO$_3$H (7-methyl) | CONH$_2$ | 2 | yellow |
| 25 | naphthyl-1,3,6-tri-SO$_3$H (7-methyl) | H | 2 | yellow |
| 26 | 2-methylnaphthyl-1,5-di-SO$_3$H | CH$_2$SO$_3$H | 3 | yellow (430 nm) |
| 27 | 5-chloro-2-methylphenyl-SO$_3$H | CH$_2$SO$_3$H | 2 | greenish yellow |

-continued

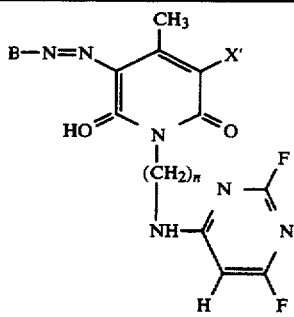

| Example | B | X' | n | Hue |
|---|---|---|---|---|
| 28 | 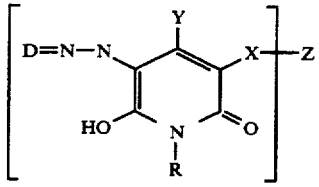 | H | 2 | greenish yellow |
| 29 | 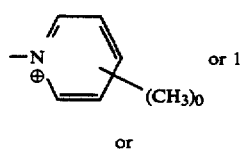 | CH$_2$SO$_3$H | 2 | golden yellow (456 nm) |
| 30 | 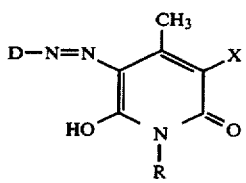 | CH$_2$SO$_3$H | 3 | golden yellow (456 nm) |

We claim:
1. A monoreactive mono- or disazo reactive dyestuff of the formula

$$\left[ D=N-N \underset{HO}{\overset{Y}{\underset{N}{\bigcirc}}} X \right] Z \quad (1)$$

in which
D denotes the radical of a diazo component,
R denotes H, a $C_1$-$C_6$-alkyl radical which is unsubstituted or substituted by OH, OSO$_3$H, NH$_2$, CO$_2$H, NH($C_1$-$C_4$-alkyl) or $C_1$-$C_4$-alkoxy, a cycloaliphatic $C_3$-$C_6$-hydrocarbon radical, a phenyl or hetaryl radical each of which is unsubstituted or substituted by SO$_3$H, CO$_2$H, CH$_3$, Cl, Br, OCH$_3$, OC$_2$H$_5$, NH$_2$, NH($C_1$-$C_4$-alkyl),
X denotes H, Cl, Br, CH$_3$, CH$_2$SO$_3$H, CH(CH$_3$)-SO$_3$H, CONH$_2$, CN, COCH$_3$, SO$_3$H,

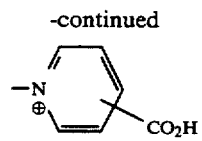 or 1 or

-continued

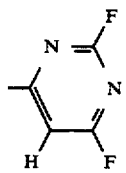

Y denotes H, OH, a $C_1$-$C_4$-alkyl radical which is unsubstituted or substituted by Cl, OH, SO$_3$H, OSO$_3$H, CO$_2$H; a phenyl or benzyl radical each of which is unsubstituted or substituted by SO$_3$H, CO$_2$H, CH$_3$, Cl, Br, OCH$_3$, OC$_2$H$_5$, NH$_2$, NH($C_1$-$C_4$-alkyl) or denotes CO$_2$H and
Z denotes a fibre-reactive radical of the formula (2)

$$\text{(2)}$$

2. A dyestuff of claim 1 of the formula $$\text{(3)}$$

in which D denotes

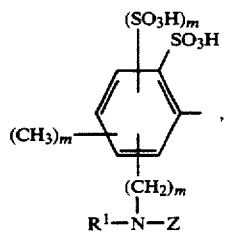

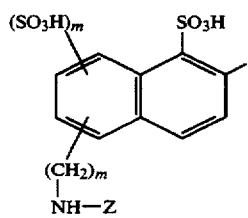

or

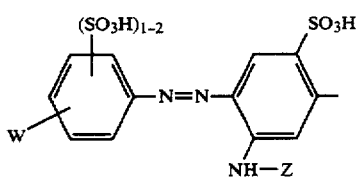

in which m denotes 0 or 1

R, $R^1$ identical or different denote H, $CH_3$, $C_2H_5$, $C_3H_7$, $C_4H_9$, $CH_2CH_2OH$, $CH_2CH_2OSO_3H$ or $CH_2CH_2CH_2$-$OCH_3$ X denotes H, $CONH_2$ or $CH_2SO_3H$, W denotes H, $CH_3$, $OCH_3$, $OC_2H_5$, Cl, Br, $NHCOCH_3$ or $NHCONH_2$.

3. A dyestuff of claim 1 of the formula

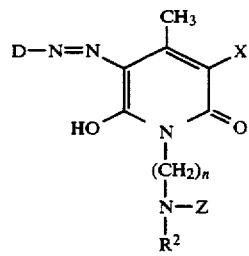

in which D denotes

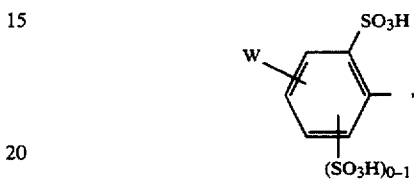

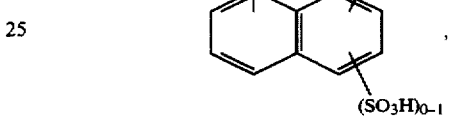

or

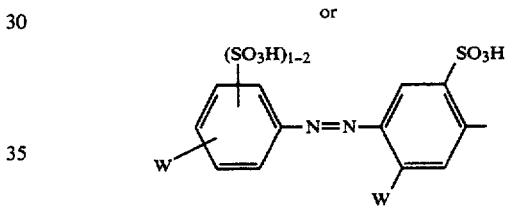

n denotes 2, 3 or 4, $R^2$ denotes H, $CH_3$, $C_2H_5$, $C_3H_7$, $C_4H_9$, $CH_2CH_2OH$, $CH_2CH_2SO_3H$, $CH_2CH_2OSO_3H$ or $CH_2CH_2CH_2$-$OCH_3$ X denotes H, $SO_3H$, $CONH_2$ or $CH_2SO_3H$, W denotes H, $CH_3$, $OCH_3$, $OC_2H_5$, Cl, Br, $NHCOCH_3$ or $NHCONH_2$.

4. A dyestuff of claim 1 of the formula

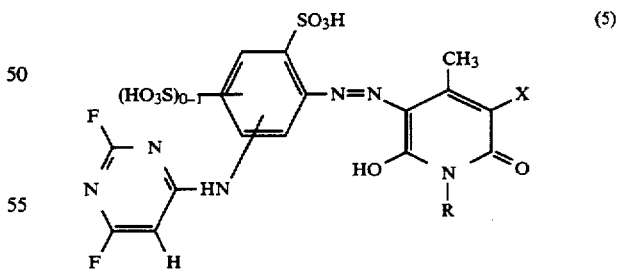

in which X and R have the meaning mentioned.

5. A dyestuff of claim 1 wherein X denotes $SO_3H$.

* * * * *

UNITED STATES PATENT AND TRADEMARK OFFICE
CERTIFICATE OF CORRECTION

PATENT NO. : 5,359,041

DATED : October 25, 1994

INVENTOR(S) : Reddig, et al.

It is certified that error appears in the above-identified patent and that said Letters Patent is hereby corrected as shown below:

Title Page      ABSTRACT: Line delete " 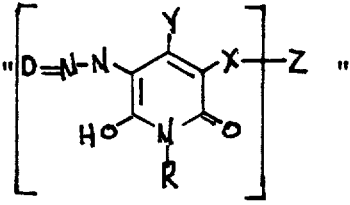 "

and substitute -- 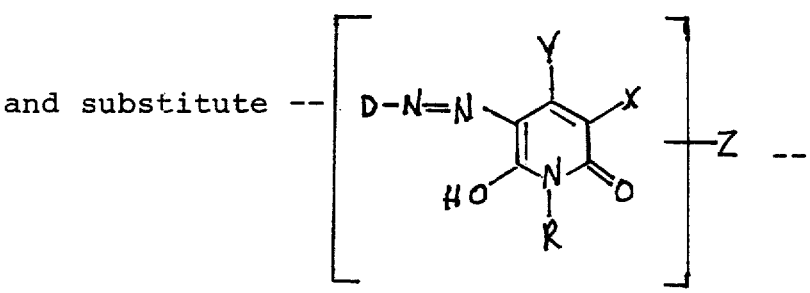 --

Col. 1, line 23    Delete " 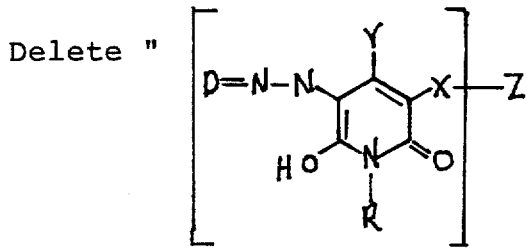 " and substitute

-- 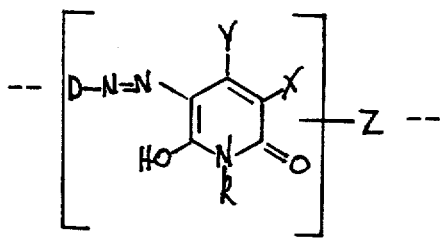 --

UNITED STATES PATENT AND TRADEMARK OFFICE
CERTIFICATE OF CORRECTION

PATENT NO.  : 5,359,041

DATED       : October 25, 1994

INVENTOR(S) : Reddig, et al.

It is certified that error appears in the above-identified patent and that said Letters Patent is hereby corrected as shown below:

Col. 17, line 43   Delete " 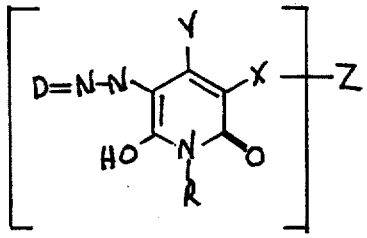 " and substitute -- 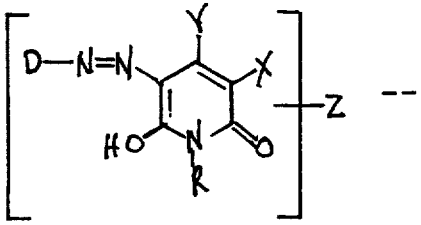 --

Col. 17, last line   Delete " SO$_3$H, "

Col. 20, line 43   Delete " SO$_3$H, "

Signed and Sealed this

Fourteenth Day of March, 1995

Attest:

BRUCE LEHMAN

Attesting Officer   Commissioner of Patents and Trademarks